UNITED STATES PATENT OFFICE.

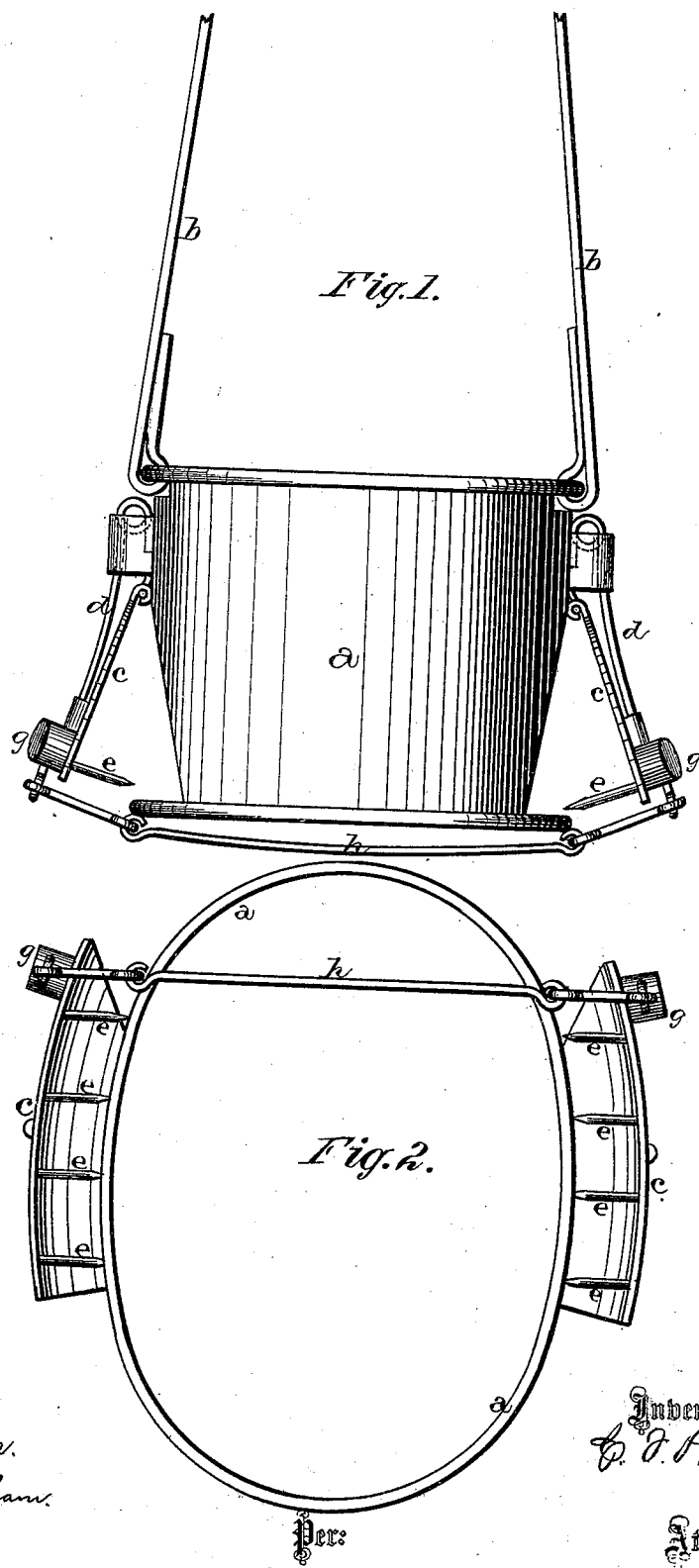

CHARLES F. PHELPS, OF WATERFORD, PENNSYLVANIA.

IMPROVEMENT IN CRIB-MUZZLES FOR HORSES.

Specification forming part of Letters Patent No. 174,702, dated March 14, 1876; application filed February 26, 1876.

*To all whom it may concern:*

Be it known that I, CHARLES F. PHELPS, of Waterford, in the county of Erie and State of Pennsylvania, have invented certain new and useful Improvements in Crib-Muzzle; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to an improved device for preventing horses from cribbing and wind-sucking; and it consists in a circular sheet-metal guard, which surrounds the sides of a horse's mouth and nose, and which is provided with a wing on each side, that is furnished with barbs, so that should the animal attempt to crib or suck wind he will press upon a jointed rod that connects the two wings, and thus draw the wings together and prick himself with the barbs, as will be more fully described hereinafter.

Figure 1 represents a front view of my invention. Fig. 2 is an inverted view of the same.

$a$ represents an oval sheet-metal guard, which entirely surrounds the horse's mouth and nose, and which is suspended from the head by the straps or cords $b$. Pivoted to each side of this guard is a gate, $c$, which is held slightly open by the springs $d$, so that the gate will never close or press inward unless drawn or forced by the horse. The inner lower edges of each gate are armed with a number of barbs, $e$, which, when the gates are drawn or forced inward, prick the horse on the sides of the nose and mouth. Upon the lower front corners of each gate is formed a horn or projection, $g$, of any kind, which serves to catch against the trough, the wall, or ceiling should the horse attempt to crib with his corner tooth alone after being prevented by the guard from cribbing in his usual manner, and, in catching against any object, the projection forces the wing inward and causes the barbs to prick him.

Connecting the two wings together is a jointed rod or chain, $h$, which projects across the under side of the guard just below the point of the lip, so that should the horse attempt to crib, suck wind, or bite, he will press upon this rod or chain, and thus draw the wings in upon him.

By keeping one of these devices upon a horse for a short time, so as to teach him that he will get punished every time he attempts to crib or suck wind, he can be broken of either or both faults.

The device is equally serviceable for a cross, biting horse, for each time that he attempts to bite, the jaws will be made to close in upon him and stick the barbs into him.

While wearing the device the horse can feed and drink as freely as usual.

Having thus described my invention, I claim—

1. The guard $a$, provided with the barbed wings $c\ e$, substantially as shown.

2. The combination of the guard $a$, wings $c\ e$, and springs $d$, substantially as described.

3. The combination of the guard $a$, wings $c$, and a connecting rod or chain, substantially as set forth.

4. The combination of the wings $c$ and the horns or projections $g$, substantially as specified.

5. The combination of the guard $a$, straps $b$, wings $c\ e$, springs $d$, horn $g$, and rod or chain $h$, substantially as shown and described.

In testimony that I claim the foregoing as my own I affix my signature in presence of two witnesses.

CHARLES F. PHELPS.

Witnesses:
 ROBT. M. BARR,
 F. A. LEHMANN.